United States Patent [19]

Fujieda et al.

[11] Patent Number: 4,621,343

[45] Date of Patent: Nov. 4, 1986

[54] CIRCUIT ARRANGEMENT FOR DETECTING ERROR IN PRINT CONTROL APPARATUS

[75] Inventors: Toshiaki Fujieda; Kazuyuki Kubo, both of Katsuta, Japan

[73] Assignee: Hitachi Koki Company, Limited, Tokyo, Japan

[21] Appl. No.: 526,771

[22] Filed: Aug. 26, 1983

[30] Foreign Application Priority Data

Aug. 27, 1982 [JP] Japan ............ 57-149758
Sep. 3, 1982 [JP] Japan ............ 57-154158

[51] Int. Cl.[4] ............ G06F 3/12

[52] U.S. Cl. ............ 364/900; 364/518; 364/519; 371/34; 371/20; 371/67

[58] Field of Search ... 364/200 MS File, 900 MS File, 364/518, 519, 523; 400/74, 54, 146; 371/16, 20, 34, 67

[56] References Cited

U.S. PATENT DOCUMENTS

| | | | |
|---|---|---|---|
| 3,629,861 | 12/1971 | Marsh et al. | 340/172.5 |
| 3,665,403 | 5/1972 | Igel et al. | 364/900 |
| 3,672,297 | 6/1972 | Berglund et al. | 101/93 C |
| 3,760,366 | 9/1973 | Gregor et al. | 364/900 |
| 3,795,186 | 3/1974 | Curtiss et al. | 101/93 C |
| 3,921,517 | 11/1975 | Barcomb et al. | 101/93.09 |
| 4,386,415 | 5/1983 | Chadra | 364/900 |
| 4,425,844 | 1/1984 | Carrington et al. | 101/93.14 |
| 4,493,084 | 1/1985 | Adachi | 371/67 |

FOREIGN PATENT DOCUMENTS

| | | |
|---|---|---|
| 2846890 | 5/1980 | Fed. Rep. of Germany . |

OTHER PUBLICATIONS

F. W. Schaaf, *Serial Printer Error Correction,* IBM Tech. Discl. Bulletin, (vol. 4, No. 11, Apr. 1962), pp. 14–15.

J. A. Clegg et al, *Printer Hammer Error Check Circuitry,* IBM Tech. Discl. Bull., (vol. 22, No. 9, Jul. 1979), pp. 719–725.

T. L. Schappe, *Hammer Check Identification,* IBM Tech. Discl. Bull., (vol. 11, No. 7, Dec. 1968), pp. 816–817.

V. C. Martin, *Hammer Check Logic,* pp. 125–126; F. W. Schaaf et al, *Print Hammer Check System,* pp. 127–128; (IBM Tech. Discl. Bull., vol. 6, No. 4).

"TTL-Kochbuch", Texas Instruments, TM 650/1172, 1st Printing, pp. 91–94.

*Primary Examiner*—Archie E. Williams, Jr.
*Attorney, Agent, or Firm*—Cushman, Darby & Cushman

[57] ABSTRACT

In a printer of the type arranged to fire print hammers in accordance with the result of comparison between character codes and print data such that a plurality of subscans are effected during an interval in which a type carrier moves by a distance corresponding to character pitch, a flag bit storing region is provided to a character code memory and/or a print data memory. Data indicative of numerical order of subscans from a print control circuit is added to several lower bits of data used to designate the address of the character code memory, and the resultant sum is compared with the flag bits read out from the flag bit storing region to see whether the addresses of the character code memory are correctly accessed. Another flag bit storing region is provided to a print data memory, and these flag bits are read out and compared with the data indicative of the numerical order of subscans to see if the addresses of the print data memory are correctly accessed. When an address of the character code memory and/or the print data memory is detected to be in error, an error signal is produced to interrupt printing.

7 Claims, 10 Drawing Figures

CIRCUIT ARRANGEMENT FOR DETECTING ERROR IN PRINT CONTROL APPARATUS

BACKGROUND OF THE INVENTION

This invention relates generally to a circuit arrangement for detecting errors in print control apparatus for a printer, such as an impact line printer.

In printers of the type arranged to print characters or the like on a print sheet by impacting type characters carried on a type band or the like, by print hammers, the print hammers are driven at appropriate timing so that desired characters are printed. To this end, the contents of a character code memory, in which codes of type characters carried by a type band or the like are prestored, are compared with the contents of a print data memory in which codes of characters to be printed on a single print line are stored. When output data read out from the character code memory and/or from the the print data memory becomes abnormal, printing of correct characters cannot be attained. Therefore, in conventional circuit arrangements, parity checking is effected against the output data from these memories for determining whether the output data is normal or not.

However, this conventional technique for checking errors does not necessarily provide accurate checking or detection because parity check error is not resulted when malfunctions occurs in circuits which designate the address of the above-mentioned memories. Therefore, in the case that malfuncion occurs in such address-designating circuits, error printing cannot be detected while printing. As a result, printed characters had to be reviewed visually by human eyes.

SUMMARY OF THE INVENTION

The present invention has been developed in order to remove the above-described drawbacks inherent to the conventional printers.

It is, therefore, an object of the present invention to provide a new and useful circuit arrangement for detecting an error in designation of an address of a character code memory and/or a print data memory from which data are read out to be compared to determine print hammers to be driven.

According to a feature of the present invention a flag bit storing region is provided to the character code memory and/or the print data memory. Data indicative of numerical order of subscans from a print control circuit is added to several lower bits of data used to designate the address of the character code memory, and the resultant sum is compared with the flag bits read out from the flag bit storing region to see whether the addresses of the character code memory are correctly accessed. Another flag bit storing region is provided to a print data memory, and these flag bits are read out and compared with the data indicative of the numerical order of subscans to see if the addresses of the print data memory are correctly accessed. When an address of the character code memory and/or the print data memory is detected to be in error, an error signal is produced to interrupt printing.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing preferred embodiments of the present invention the above-mentioned coventional technique will be described for a better understanding of the present invention.

Figure 1:
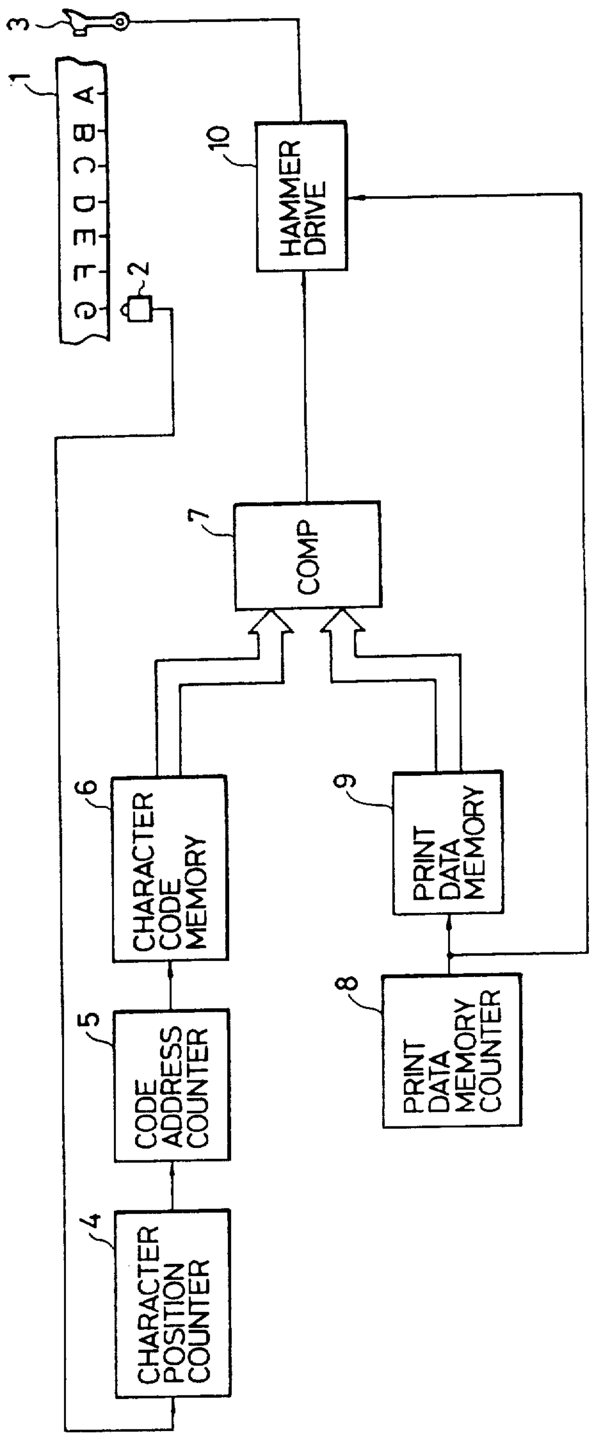
FIG. 1 is a schematic block diagram of a printer to which the present invention is adapted.

FIG. 1 shows a schematic block diagram of a printer of the type having a plurality of types carried on a type band 1. The type band 1 is a loop, and is arranged to be driven at a given speed. The type characters on the type band 1 are selectively impacted by a plurality of print hammers 3 which are driven at appropriate timings by a hammer drive circuit 10. A character mark sensor 2 is provided adjacent to the type band 1 for detecting character marks each provided for each type character. An output signal from the character mark sensor 2 is fed to a character position counter 4 to increase the count thereof one by one as each character mark is detected. An output signal from the character position counter 4 is fed to code address counter 5 which produces an address of a character code memory 6 in which codes of all the type characters on the type band 1 are prestored. Therefore, character codes are read out from the character code memory 6, and are fed to a comparator 7. On the other hand, a print data memory 9 is provided to temporarily store print data indicative of characters to be printed on a print line. The address of the print data memory 9 is designated by an output signal from a print data memory counter 8.

In conventional circuit arrangements, parity checking is effected against the output data from the character code memory 6 and also the output data from the print data memory 9 so as to detect abnormal output data. However, when output data from any of the character position counter 4, the code address counter 5, and the print data memory counter 8 is incorrect, such parity checking cannot detect the incorrect output data from these circuits 4, 5, 8. In other words, when the address of the character code memory 6 and/or the print data memory 9 is in error, such parity checking cannot detect the error because parity checking only detects the correctness of output data read out from these memories.

The present invention removes such drawbacks inherent to the conventional circuit arrangement by detecting abnormal condition of a printer caused from errors or incorrect data from the character position counter 4, the code address counter 5, and/or the print data memory counter 8. In the present invention, it is checked whether addresses of the character code memory 6 and/or the print data memory 9 are read out in a predetermined order or not. Namely, since the addresses of the character code memory 6 and the print data memory 9 are in a predetermined order, the order of the addresss designated by the output data from the code address counter 5 and the print data memory counter 8 are checked to see if the order corresponds to the predetermined order or not. The contents of the character code memory 6 and the print data memory 9 are respectively read out for comparison, which is called a print scan.

Figure 2:
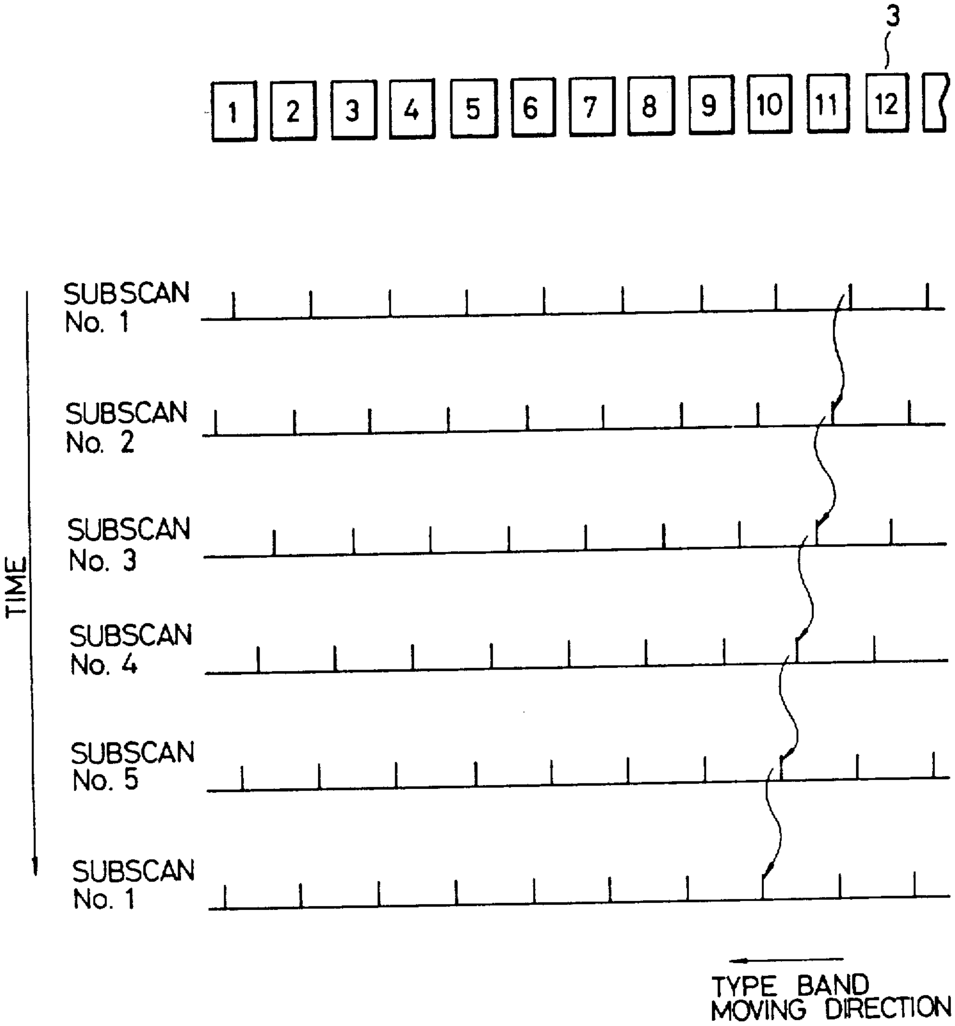
FIG. 2 is an explanatory diagram showing the relationship between a plurality of type characters on a type carrier and a plurality of print hammers.

FIG. 2 shows a diagram showing the relationship between a plurality of type characters on the type band 1 and print hammers 3 of FIG. 1. The position of type characters is shown by vertical short lines arranged on horizontal long lines each of which indicates a subscan. In the illustrated example, five subscans constitute a single print scan in which the type band 1 moves by a distance equal to the character pitch. A plurality of subscans are required because type characters do not correspond to print hammers 3 one by one. Such print scan comprising a plurality of subscans is known in the prior art, for instance, U.S. Pat. No. 3,921,517. In the illustrated example, five type characters correspond to six print hammers approximately. For this reason, subscans are effected five times each time the type band 1 moves a predetemined distance equal to the pitch of the type characters. During each subscan, comparison is effected such that every fourth character code is compared with every fifth print position print data. In a following diagram, print positions and type character positions subjected to comparison in respective subscans are shown. It is assumed that each print line includes 136 places or print positions, while 64 type characters are provided on the type band 1. Numerals without brackets indicate print positions, while numerals within brackets indicate the position of the type characters. It is also assumed that all the places of the print data and the type positions are correctly read out in a predetermined order in a direction of arrows.

ONE PRINT SCAN

SUBSCAN No. 1: 1(1), 6(5), 11(9) . . .
126(37), 131(41), 136(45)

SUBSCAN No. 2: 2(2), 7(6), 12(10) . . .
127(38), 132(42), X(X)

SUBSCAN No. 3: 3(3), 8(7), 13(11) . . .
128(39), 133(43), X(X)

-continued

SUBSCAN No. 4: 4(4), 9(8), 14(12) . . .
129(40), 134(44), X(X)

SUBSCAN No. 5: 5(5), 10(9), 15(13) . . .
130(41), 135(45), X(X)

As will understood from the above, the character code memory 6 and the print data memory 9 are respectively accessed to read out data therefrom in a predetermined order on each subscan. For instance, on subscan No. 1, comparison of data is effect such that character code of a first type character on the type band 1 is compared with print data of a first print position, i.e. the leftmost position on a print line, and then a fifth character code is compared with a sixth print data. In this way, comparison is continuously effected in connection with every fourth type characters and every fifth print positions. The order of the character positions, whose data is subjected to comparison, is predetemined and constant for each subscan. Similarly, the order of the print positions, whose data is subjected to comparison, is predetemined and constant for each subscan. Therefore, if it is checked whether data is read out in the above order of type characters and/or print positions, an abnormal or incorrect address data from the code address counter 5 and/or the print data memory counter 8 caused from malfunction of the the character position counter 4 and/or the code address counter 5 may be detected.

Figure 4:
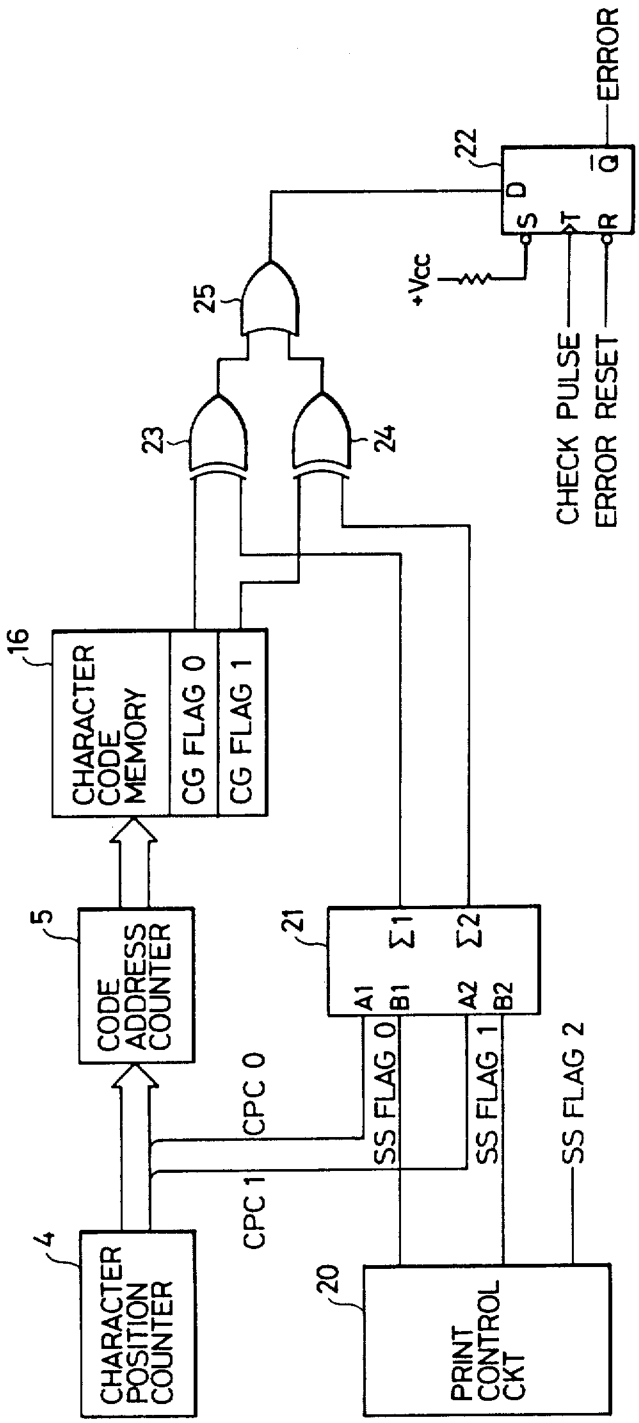
FIG. 4 is a schematic block diagram of the first embodiment circuit arrangement.
Figure 10:
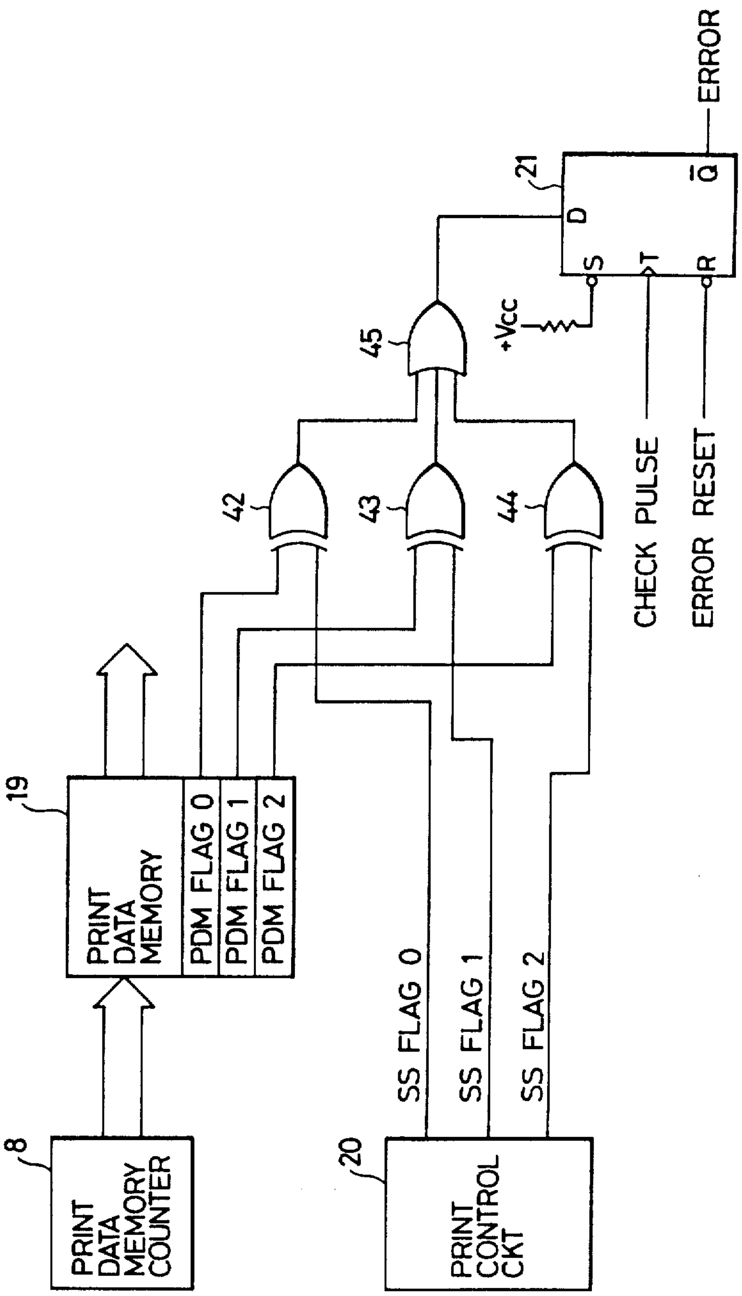
FIG. 10 is a schematic block diagram of the second embodiment circuit arrangement.

One embodiment of the present invention, which will be described hereafter with reference to FIG. 4, is directed to checking of addresses of the character code memory 6, while a second embodiment, which will be described with reference to FIG. 10, is directed to checking of addresses of the print data memory 9. Generally speaking, the addresses of the character code memory 6 have more chance to be erroneously designated than the address of the print data memory 9 because the addresses of the character code memory 6 is designated in response to an external signal fed from the character mark sensor 2. Although it is preferable to employ the first and second embodiment circuit arrangements so that address checking is effected in connection with both the character code memory 6 and the print data memory 9, only one of them may be used in a printer. In the case that only one of the first and second embodiment circuit arrangements is employed, the second embodiment circuit arrangement used for checkihg the addresses of the print data memory 9 may be omitted for the above reason.

Figure 3:
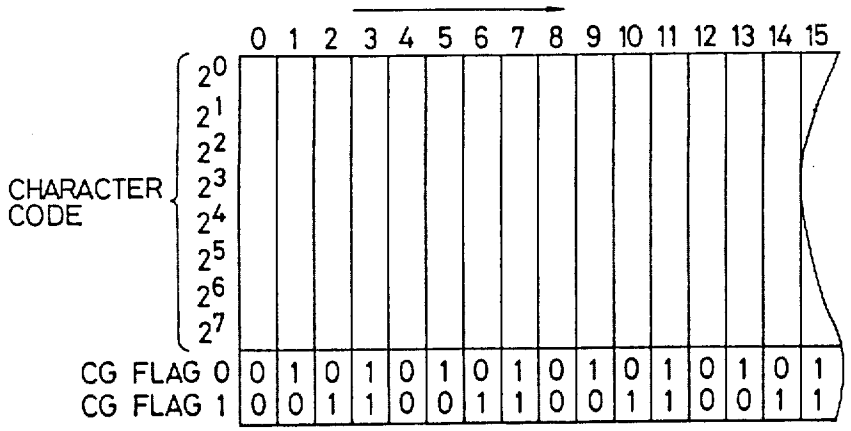
FIG. 3 is a diagram showing the contents of a character code memory used in a first embodiment of the present invention.

FIG. 3 shows a schematic diagram showing the contents of a character code memory 16 used in the present invention. The character code memory 16, which is also called character generator, comprises a character code storing region for storing a plurality of 8-bit character codes in the same manner as in conventional arrangements, and a flag storing region for storing a plurality of pairs of flag bits CG FLAG 0 and CG FLAG 1. Identical data has been written into positions of the flag storing region, from which positions data is read out on respective subscans. In detail, flag bit data has been written as shown in FIG. 3 such that data (0, 0), (1, 0), (0, 1), (1, 1), (0, 0) have been respectively written at character positions from which data is read out on subscans No.1, No.2, No.3, No.4 and No.5. As a result, flag bits of the same data is read out on the same subscan.

Figure 7:
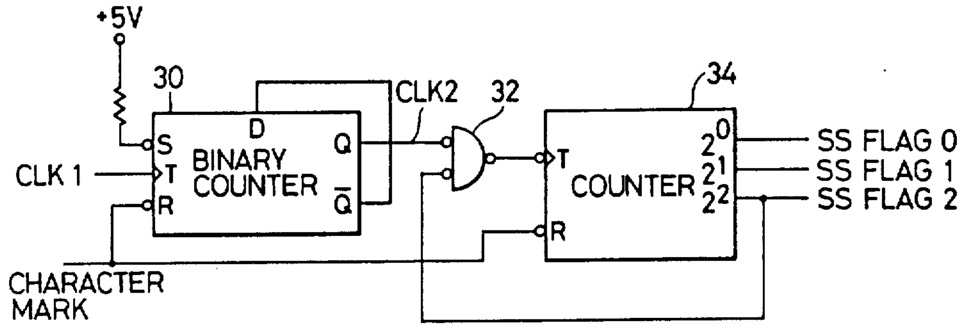
FIG. 7 is a circuit diagram of the print control circuit of FIG. 4.
Figure 8:
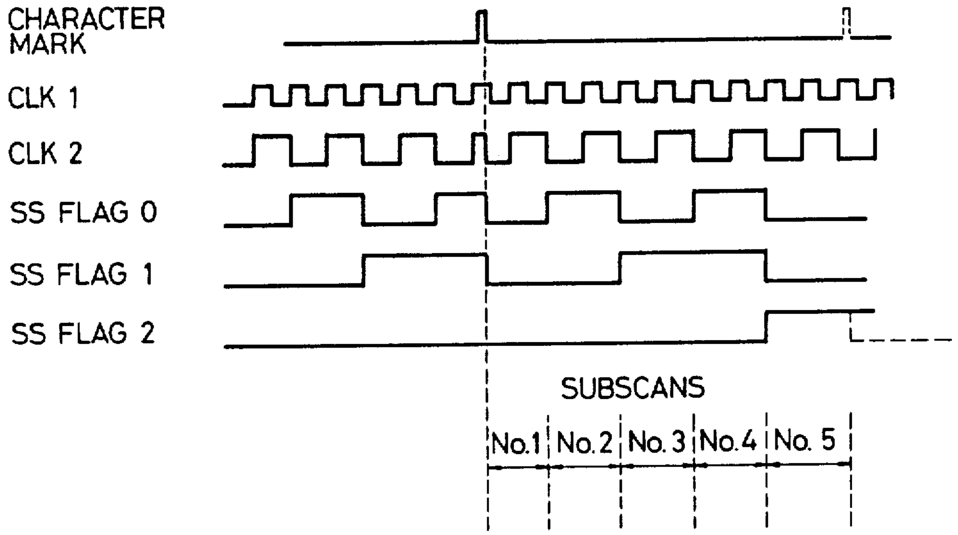
FIG. 8 is a timing chart showing the operation of the print control circuit of FIG. 7.

FIG. 4 shows a schematic block diagram of an embodiment of the circuit arrangement according to the present invention. The circuit arrangement comprises a print control circuit 20 which generates 3-bit flag data SS FLAG 0, SS FLAG 1, and SS FLAG 2, which correspond to the number of subscans. The print control cicuit 20 per se is also used in conventional circuitry in which subscans are effected, and comprises as shown in FIG. 7 a binary counter 30, an INVERT NAND gate 32 and a counter 34. The binary counter 30 is responsive to a clock 1 having a period equal to one-tenth of one character marck pitch. The INVERT NAND gate 32 is provided to prevent the flag SS FLAG 0 from assuming high level in the case that a character mark signal is retarded due to speed variation of the character band 1. A time chart useful for understnding the operation of the print control circuit 20 is shown in FIG. 8.

Figure 5:
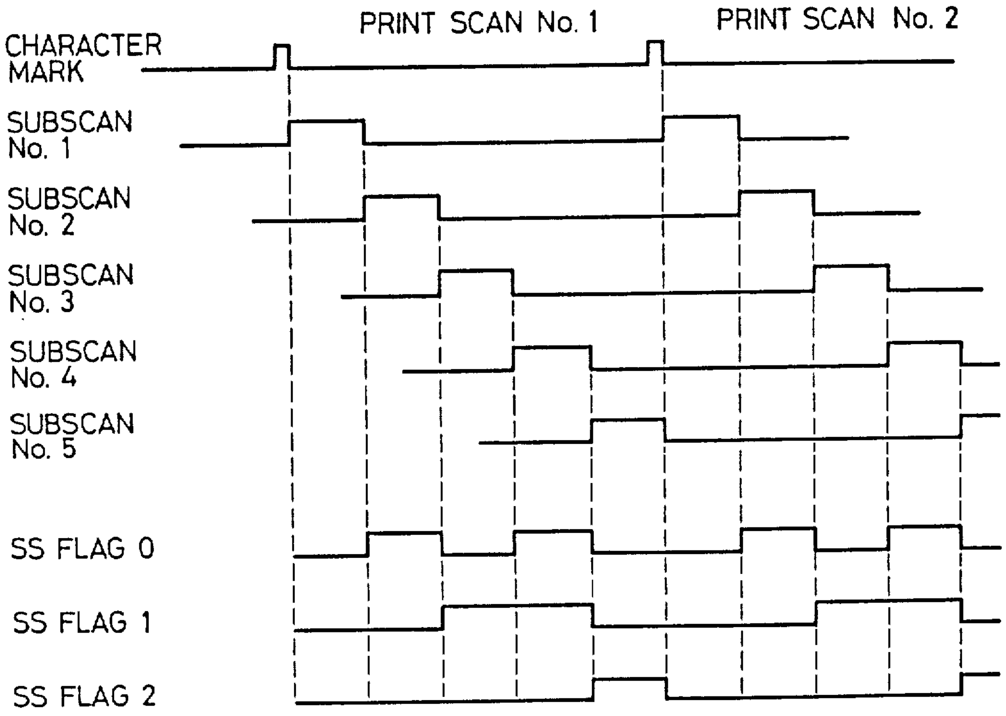
FIG. 5 is an explanatory diagram showing data indicative numerical order of subscans from a print control circuit.
Figure 6:
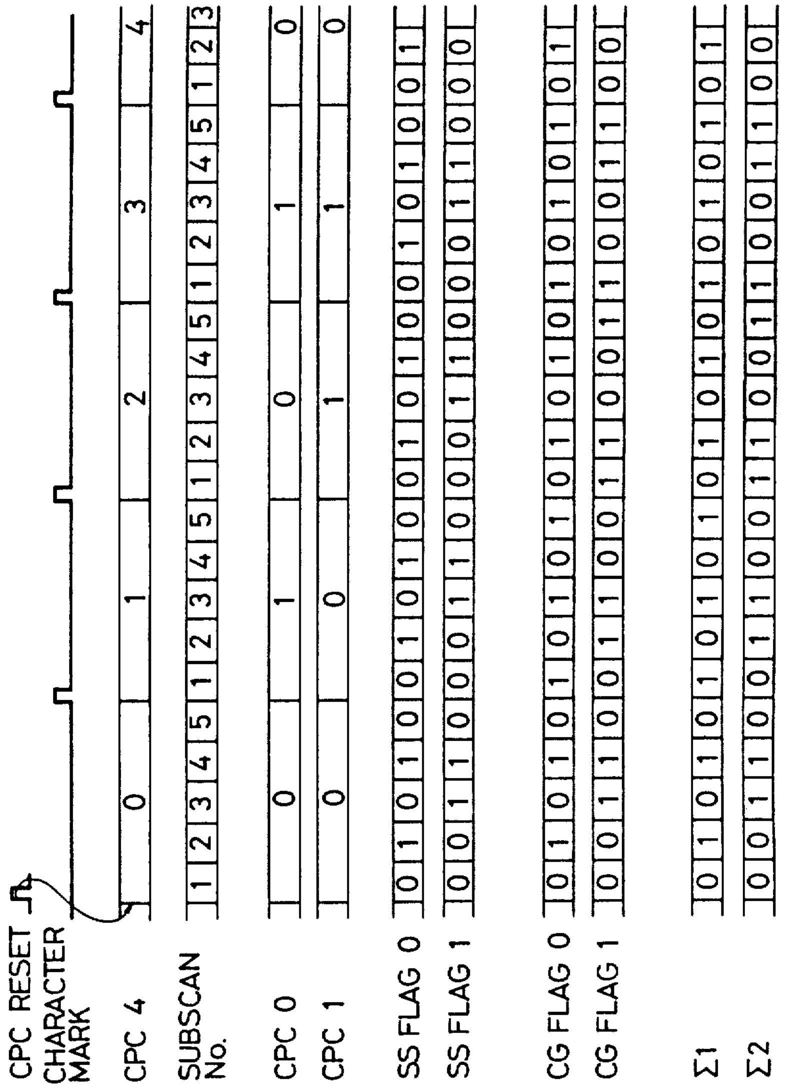
FIG. 6 is an explanatory diagram useful for understanding the operation of the first embodiment circuit arrangement.

The state of the flag data is such that (0, 0, 0), (1, 0, 0), (0, 1, 0), (1, 1, 0) and (0, 0, 1) for respective subscans No.1 through No. 5 as shown in FIG. 5. An adder 21 is provided to be responsive to the flag data SS FLAG 0 and SS FLAG 1, and also to lower two bits of output data from a character position counter 4. These lower two bits from the character postion counter 4 are designated at the references CPC 0 and CPC 1. The adder 21 is arranged to produce a first output at its first output terminal Σ1 as a result of addition by adding the flag bit SS FLAG 0 to the bit CPC 0, and a second output at its second output termnal Σ2 as a result of addition of a carry obtained by the addition of SS FLAG 0 to CPC 0 to flag bit SS FLAG 1 and the bit CPC 1. As the adder 21 may be used a four-bit Binary Full Adder IC HDL74LS283 manufactured by Hitachi Ltd. These first and second outputs Σ1 and Σ2 from the adder 21 respectively should equal the flag bits CG FLAG 0 and CG FLAG 1 from the character code memory 16 as shown in FIG. 6. Therefore, it is possible to detect abnormal conditions of accessed addresses of the character code memory 16, by observing and watching whether the outputs Σ1 and Σ2 from the adder 21 are respectively equal to the flag bits CG FLAG 0 and CG FLAG 1 from the character code memory 16. In order to check this coincidence anticoincidence circuits (EX-OR gates) 23 and 24 are provided. The first EX-OR gate 23 is responsive to Σ1 and CG FLAG 0, while the second EX-OR gate 24 is responsive to Σ2 and CG FLAG 1. Namely, the EX-OR gates 23 and 24 respectively produce logic "0" ouptuts when an accessed address of the character code memory 16 is normal, and at least one of them produces logic "1" output when abnormal. The ouptut signals from the EX-OR gates 23 and 24 are fed via an OR gate 25 to D input terminal of a D-type flip flop 22. Therefore, if at least one of the EX-OR gates 23 and 24 produces a logic "1" output, the D-type flip-flop 22 produces at its output terminal $\overline{Q}$, an error signal of logic "0" at a timing of the check pulse applied to a trigger input terminal T thereof. This error signal may be used to interrupt or terminate printing. To this end the error signal may be applied to the hammer drive circuit 10 to prevent misprinting. However, printing is not required to be interrupted in connection with all the print positions in the presence of such an error signal. Namely, it is only required to interrupt the firing of a particular print hammer 3 corresponding to a print position where the above-mentioned error signal occurred. When the particular print hammer 3 is not fired, its correspondig print position remains unprinted. In order to print on this unprinted print position, print scan may be effected again. The check pulse applied to the D-type flip-flop 22 is produced by a pulse generator each time the addresses of the character code memory 16 is accessed to read out data therefrom.

The above-described embodiment is directed to detection of misaddressing of the character code memory 6 of FIG. 1, and now a second embodiment directed to detection of misaddressing of the print data memory 9 of FIG. 1 will be described. The addresses of the print data memory 9 are designated by the output signal from the print data memory counter 8 as described at the beginning of the specification. Since the addresses of the print data memory 9 are in a given order, it is possible to check whether the addresses thereof are accessed at the predetermined order or not.

Figure 9:
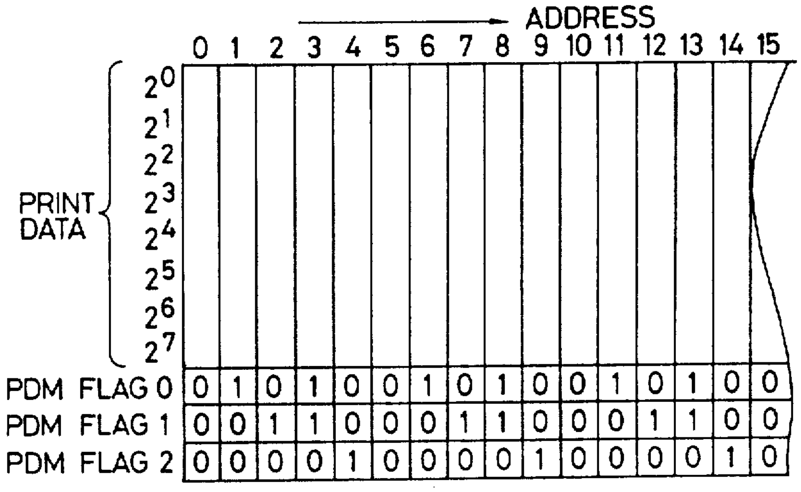
FIG. 9 is diagram showing the contents of a print data memory used in a second embodiment circuit arrangement.

FIG. 9 shows the contents of a print data memory 19 used in the present invention. The print data memory 19 comprises a flag bit storing region for storing three flag bits PDM FLAG 0, PDM FLAG 1, and PDM FLAG 2, in addition to a print data storing region. Identical data has been written into positions of the flag storing region, from which positions data is read out on respestive subscans. In detail, flag bit data has been written as shown in FIG. 9 such that data (0, 0, 0), (1, 0, 0), (0, 1, 0), (1, 1, 0), (0, 0, 1) have been respectively written at addresses from which print data is read out on subscans No.1, No.2, No.3, No.4 and No.5. As a result, flag bits of the same data is read out on the same subscan.

FIG. 10 shows a schematic block diagram of the second embodiment of the circuit arrangement according to the present invention. The circuit arrangement comprises a print control circuit 20 which generates 3-bit flag data SS FLAG 0, SS FLAG 1, and SS FLAG 2 in the same manner as in the first embodiment of FIG. 4.

The state of the flag data is such that (0, 0, 0), (1, 0, 0), (0, 1, 0), (1, 1, 0) and ((0, 0, 1) for respective subscans No.1 through No. 5 as already described and shown in FIG. 5. Therefore, it is possible to detect abnormal conditions of accessed addresses of the print data memory 19, by observing and watching whether the flag bits PDM FLAG 0 through PDM FLAG 2 are respectively equal to the flag data SS FLAG 0 through SS FLAG 2 from the print control circuit 20. In order to check this coincidence EX-OR gates 42 and 44 are provided. The first EX-OR gate 42 is responsive to PDM FLAG 0 and SS FLAG 0, while the second and third EX-OR gates 43 and 44 are respectively responsive to PDM FLAG 1 and SS FLAG 1, and to PDM FLAG 2 and SS FLAG 2. Namely, the EX-OR gates 42 through 44 respectively produce logic "0" ouptuts when the accessed address of the print data memory 19 is normal, and at least one of them produces logic "1" output when abnormal. The ouptut signals from the EX-OR gates 42 through 44 are fed via an OR gate 45 to D input terminal of a D-type flip flop 46. Therefore, if at least one of the EX-OR gates 42 through 44 produces a logic "1" output, the D-type flip-flop 46 produces at its output terminal $\overline{Q}$, an error signal of logic "0" at a timing of the check pulse applied to a trigger input terminal T thereof. This error signal may be used to interrupt or terminate printing in the same manner as in the first embodiment. The check pulse applied to the D-type flip-flop 46 is produced by a pulse generator each time the addresses of the print data memory 19 is accessed to read out data therefrom.

The above-described first and second embodiments may be combined so that both the addresses of the character code memory 6 and the print data memory 9 of FIG. 1 can be checked to see if there is an error. From the foregoing, it will be understood that the addresses of the character code memory and/or the print data memory can be accurately checked to prevent misprinting.

The above-described embodiments are just examples of the present invention, and therefore, it will be apparent for those skilled in the art that many modifications and variations may be made without departing from the spirit of the present invention.

What is claimed is:

1. A circuit arrangement for detecting abnormal conditions in a printer of the type arranged to impact type characters carried on a type carrier by means of a plurality of print hammers, where said print hammers are selectively driven through comparison between data from a character code memory, from which character codes corresponding to the type characters are read out in accordance with an address signal from a first address counter, and data from a print data memory in which data indicative of characters to be printed is temporarily stored, said printer having a detector for detecting character marks on said type carrier and a character position counter for counting detected character marks to produce an output signal indicative of the count of said character marks for driving said first address counter, said comparison being performed by effecting a plurality of subscans in each of which print data of predetermined print positions are compared with character codes of predetermined character positions so that said plurality of subscans constitute a print scan effected each time said type characters move to print by the character pitch, said subscans being effected in response to count up signals from a print control circuit which is responsive to the detected character marks, said print data memory being driven by a second address counter responsive to another count up signal from said print control circuit, said print control circuit producing subscan flag data indicative of the numerical order of said subscans, said subscan flag data being used for preloading data related to subscans in said first and second address counters, said circuit arrangement comprising:

(a) a flag storage for storing identical flag data at addresses to be read out on the same subscan, addresses of said flag storage being arranged to be designated by said first address counter so that each of said flag data is read out simultaneously with each of said character codes of said character code memory;

(b) first means for adding several lower bits of output data from said character position counter to several lower bits of output data from said print control circuit; and (c) second means for comparing a result of addition from said first means with said flag data from said flag storage for producing an error signal on anticoincidence.

2. A circuit arrangement as claimed in claim 1, wherein said first means comprises a full adder responsive to 2-bit signals.

3. A circuit arrangement as claimed in claim 2, wherein said second means comprises first and second EX-OR gates respectively responsive to one of two flag bits from said flag storage and to one of two outputs from said full adder; and OR gate responsive to output signals from said first and second EX-OR gates; and a D-type flip-flop responsive to an output signal from said OR gate at its D input and to a check pulse at its trigger terminal, wherein said check pulse is produced each time said character code memory is accessed.

4. A circuit arrangement for detecting abnormal conditions in a printer of the type arranged to impact tyep characters carried on a type carrier by means of a plurality of print hammers, where said print hammers are selectively driven through comparison between data from a character code memory, from which character codes corresponding to the type characters are read out in accordance with an address signal from a first address counter, and data from a print data memory in which data indicative of characters to be printed is temporarily stored, said printer having a detector for detecting character marks on said type carrier and a character position counter for counting detected character marks to produce an output signal indicative of the count of said character marks for driving said first address counter, said comparison being performed by effecting a plurality of subscans in each of which print data of predetermined print positions are compared with character codes of predetermined character positions so that said plurality of subscans constitute a print scan effected each time said type characters move to print by the character pitch, said subscans being effected in response to count up signals from a print control circuit which is responsive to the detected character marks, said print data memory being driven by a second address counter responsive to another count up signal from said print control circuit, said print control circuit producing subscan flag data indicative of the numerical order of said subscans, said subscan flag data being used for preloading data related to subscans in said first and second address counters, said circuit arrangement comprising:

(a) a flag storage for storing identical flag data at addresses to be read out on the same subscan, addresses of said flag storage being arranged to be designated by said first address counter so that each of said flag data is read out simultaneously with each of said character codes of said print data memory; and (b) means for comparing said data from said print control circuit with said flag data from said flag storage for producing an error signal on anticoincidence.

5. A circuit arrangement as claimed in claim 4, wherein said means for comparing first through third EX-OR gates respectively responsive to one of three flag bits from said flag storage and to one of three outputs from said print control circuit; or OR gate responsive to output signals from said first through third EX-OR gates; and a D-type flip-flop responsive to an output signal from said OR gate at its D input and to a check pulse at its trigger terminal, where said check pulse being produced each time said print data memory is accessed.

6. A circuit arrangement for detecting errors in character codes read out from memories in a printer of the type arranged to impact type characters carried on a type carrier by means of a plurality of print hammers, where said print hammers are selectively driven through comparison between code of each character on said type carrier which character is at a given position and code of each character to be printed, said circuit arrangement comprising:

(a) first means for detecting character marks on said type carrier;
(b) second means responsive to said first means for counting the number of detected character marks;
(c) a character code memory for storing codes of characters carried on said type carrier;
(d) a print data memory for temporarily storing codes of characters to be printed;
(e) a print control circuit responsive to said first means for producing first and second count up signals each including a predetermined number of pulses for performing subscans, said print control circuit also producing subscan flag data indicative of the numerical order of subscans;
(f) a code address counter responsive to said second means and to said first count up signal for designating addresses of said character code memory at an interval of a predetermined number of addresses which is equal to the predetermined number of pulses of said first count up signal;
(g) a print data address counter responsive to said second count up signal for designating addresses of said print data memory at an interval of a predetermined number of addresses which is equal to the predetermined number of pulses of said second count up signal;
(h) a flag storage for storing predetermined flag data, said flag storage being responsive to said code address counter so that said flag data is read out simultaneously with character code read out from said character code memory; and
(i) an error detector responsive to said subscan flag data from said print control circuit, said flag data from said flag storage, and several lower bits of data from said character position counter, said error detector having:
third means for adding several lower bits of output data from said second means to several lower bits of said subscan flag data from said print control circuit; and
fourth means for comparing a result of addition from said third means with said flag data from said flag storage to produce an error signal on anticoincidence.

7. A circuit arrangement for detecting errors in character codes read out from memories in a printer of the type arranged to impact type characters carried on a type carrier by means of a plurality of print hammers, where said print hammers are selectively driven through comparison between code of each character on said type carrier which character is at a given position and code of each character to be printed, said circuit arrangement comprising:
(a) first means for detecting character marks on said type carrier;
(b) second means responsive to said first means for counting the number of detected character marks;
(c) a character code memory for storing codes of characters carried on said type carrier;
(d) a print data memory for temporarily storing codes of characters to be printed;
(e) a print control circuit responsive to said first means for producing first and second count up signals each including a predetermined number of pulses for performing subscans, said print control circuit also producing subscan flag data indicative of the numerical order of subscans;
(f) a code address counter responsive to said second means and to said first count up signal for designating addresses of said character code memory at an interval of a predetermined number of addresses which is equal to the predetermined number of pulses of said first count up signal;
(g) a print data address counter responsive to said second count up signal for designating addresses of said print data memory at an interval of a predetermined number of addresses which is equal to the predetermined number of pulses of said second count up signal;
(h) a flag storage for storing predetermined flag data, said flag storage being responsive to said code address counter so that said flag data is read out simultaneously with character code read out from said character code memory; and
(i) an error detector responsive to said subscan flag data from said print control circuit and said flag data from said flag storage for comparing said subscan flag data with said flag data from said flag storage to produce an error signal on anticoincidence.

* * * * *